United States Patent [19]

Eriksson

[11] 3,959,195

[45] May 25, 1976

[54] FRACTIONATED SAWDUST CHIPBOARD AND METHOD OF MAKING SAME

[75] Inventor: Erik Gustav Lennart Eriksson, Karlstad, Sweden

[73] Assignee: AB Karlstadplattan, Karlstad, Sweden

[22] Filed: June 13, 1974

[21] Appl. No.: 478,952

Related U.S. Application Data

[63] Continuation-in-part of Ser. No. 136,774, April 23, 1971, abandoned.

[30] Foreign Application Priority Data

Apr. 24, 1970 Sweden .............................. 5740/70

[52] U.S. Cl. .............................. 260/17.3; 156/62.2; 260/6; 260/7; 260/7.5; 260/8; 260/9; 260/17.2; 260/17.4 R; 264/113; 264/122; 428/326

[51] Int. Cl.² ............................................ C08L 1/02

[58] Field of Search ........... 156/62.2; 264/113, 122; 161/162; 260/17.3; 428/326

[56] References Cited

UNITED STATES PATENTS

| | | | |
|---|---|---|---|
| 3,098,781 | 7/1963 | Greten | 264/113 X |
| 3,283,048 | 11/1966 | Hoppeler | 264/113 |
| 3,843,431 | 10/1974 | Dostalik | 156/62.2 |
| 3,846,219 | 11/1974 | Kunz | 156/62.2 |

FOREIGN PATENTS OR APPLICATIONS

| | | | |
|---|---|---|---|
| 302,254 | 6/1971 | U.S.S.R. | 264/113 |
| 962,188 | 7/1964 | United Kingdom | 156/62.2 |
| 809,332 | 2/1959 | United Kingdom | 264/113 |

*Primary Examiner*—Donald E. Czaja
*Assistant Examiner*—Edward Woodbury

[57] ABSTRACT

A chipboard structure is disclosed which is made substantially of 100% sawdust waste material. The chipboard has a core portion which contains the coarsest particles of the sawdust, the surface portions of the chipboard containing the finest fraction of the sawdust, intervening portions of the chipboard containing fractions which increase in size from the surface to the core portion of the chipboard. The method and apparatus involve the use of sawdust having a width and/or thickness no greater than 4.75 mm, the fractions of the sawdust having a particle size greater than 0.1 mm being sliced to increase the quantity of the fractions below 0.1 mm. Because the small particles are randomly disposed in the chipboard in directions not only parallel to the plane but also perpendicular and at an angle thereto, characteristics are obtained which are as good as chipboard produced from conventional materials other than sawdust.

10 Claims, 3 Drawing Figures

FRACTIONATED SAWDUST CHIPBOARD AND METHOD OF MAKING SAME

This application is a continuation-in-part of U.S. Ser. No. 136,774 filed Apr. 23, 1971 and now abandoned.

This invention relates to a process and apparatus for manufacture of chipboards from sawdust, preferably exclusively of sawdust. The invention also relates to chipboards made from sawdust with the process and apparatus of the invention.

By practice of the invention, as more fully hereinafter described, it is possible to make low density chipboards which exhibit the favorable bending and transverse tensile strength characteristics of high density chipboard structures made from raw materials which are more expensive than sawdust obtained as waste from, for example, sawmills.

BACKGROUND OF THE INVENTION

Experiments have been conducted to determine whether saw cuttings are suitable for use in the manufacture of chipboards. The first industrial manufacture of chipboards using saw cuttings as a raw material began in 1948, at which time boards with a volumetric weight between 0.8 and 1.1g/cm$^3$ were made using phenol formaldehyde resins. These boards had only limited acceptance and their manufacture soon ceased. Studies were also made of the possibility of using saw cuttings in conjunction with 8–10% of a binding agent for the manufacture of chipboard but chipboard thus produced failed to meet the high standards of industry and were moreover expensive to make.

More specifically, W. Klauditz in laboratory experiments found that the bending strength of chipboards, with a volumetric weight of 0.8 g/cm$^3$, was about 110 kg/cm$^2$ using unprocessed cubelike spruce saw cuttings from frame saws and about 500 kg/cm$^2$ using 0.1–0.3 mm thick chips of 12 to 35 mm length and 5 to 7 mm width. The corresponding figures for a volumetric weight of 0.6 g/cm$^3$ are respectively 30 kg/cm$^2$ and 300 kg/cm$^2$ and for a volumetric weight of 1.1 g/cm$^3$, about 400 kg/cm$^2$ and about 700 kg/cm$^2$. These findings suggest that saw cuttings may be used for heavy high density chipboards but not for light low density chipboards. On the other hand, while investigations by W. Klauditz, H. J. Ulbricht and W. Kratz suggested that saw cuttings could be used for making low density chipboards, this was only possible at the sacrifice of tensile and bending strength because of the large length, width and thickness of the saw cuttings used.

In making chipboard, saw cuttings have been fractionated into different sizes. This has been done to conserve adhesive. For example, it is known that coarser fractions require less adhesive e.g. about 3–4% as against approximately 5 times this amount for finner fractions. The fine fractions excepting for their use as adhesive carriers have generally been discarded because it was believed that the chipboard properties were adversely affected thereby. On the other hand, chipboards made essentially from the coarser fractions of saw cuttings, even when optimum amounts of glue were used, consistently exhibited lower values of bending strength, tensile strength, compressive strength and bending modulus of elasticity.

To improve the properties of chipboard made from saw cuttings, about 30% of conventional chipboard materials were mixed with the saw cuttings, destined to form the surface layers of chipboards, in order to increase the bending strength and modulus of elasticity. While some improvement in these properties was obtained, it was found there was an offsetting reduction in the transverse tensile strength of the chipboard. Moreover, the conventional materials when used added to the cost of the chipboard.

O. Liiri also found that boards of saw cuttings have a lower bending strength than conventional chipboards. The transverse tensile strength while proportionately better than the bending strength was nevertheless found to be inferior to that of conventional chipboard. Liiri concluded that the bending strength was adversely affected by the fine grain cuttings from circular saws which he therefore considered to be inferior, as a raw material source, to the coarse cuttings from a frame saw. In his experiments Liiri therefore separated for use the larger frame saw derived particles from the finer circular saw derived sawdust particles; i.e. those particles which passed through a 50 mesh ASTM screen (0.30 mm openings). Like Klauditz and others, Liiri believed that improved strength of boards made of coarse saw cuttings, in particular its bending strength, would follow if the surface layer material were mixed with chip material, other than sawdust, normally used for making conventional chipboard. Even with the incorporation of such conventional chip material a fully satisfactory bending strength was not obtained. Hence, chipboards produced in the laboratory have poorer characteristics than conventionally made chipboards, particularly bending strength.

In addition to the foregoing investigations, there are a number of publications which have reported on laboratory investigations in which saw cuttings were used as a raw material for making chipboards. In the process of making the chipboard, the oversized coarse and fine fractions were, however, removed from the raw material saw cutting source in the belief that these fractions adversely affected the properties of the final chipboard.

It will be evident from the foregoing, that aside from experimental laboratory activity, there has been no commercial process until the present invention for producing chipboards exclusively of sawdust using fine sawdust cuttings from a circular saw in conjunction with the coarser sawdust cuttings from a frame saw.

SUMMARY OF THE INVENTION

Sawdust suitable for the purpose of this invention is the waste from, for example, frame saw, band saw, circular saw or cross-cutting saw operations, or the like. Sawdust from frame saw and circular saw operations are preferred and may exclusively be used for making the chipboard of the invention, in which case about 14% by volume of the saw dust will be circular saw cuttings and the remainder frame saw cuttings. Sawdust from frame saw operations is coarser than that obtained with circular saws.

In any event each sawdust particle, used in the practice of this invention has a length less than about 10 mm, a width no more than about 4.75 mm and a thickness no greater than the width, preferably smaller. Those particles in the raw material source having a thickness and/or width greater than about 4.75 mm are either rejected to waste or are subjected to further treatment as, for example, by chopping the particles e.g. with wood choppers, to reduce the particle width and/or thickness to under 4.75 mm. Hence, "sawdust" as a raw material for purposes of this invention is restricted to wood particles having a length (1) less than about 10mm, a width (w) no more than about 4.75 mm and a thickness which is not greater than the width, preferably smaller, with the ratio of the length to the thickness of each particle being less than about 15 before processing and less than about 30 after processing, as for example, by slicing each particle into half its width and/or its thickness. This slicing feature is an important aspect of the invention as will be seen from the ensuing description.

One of the main objectives of the invention is to make possible the manufacture of chipboard exclusively of waste sawdust which will exhibit all of the favorable characteristics of chipboard made with more expensive materials.

This objective is realized by providing, in accordance with the invention, a method of making chipboard from 100% sawdust, the method comprising separating particles of sawdust of length less than about 10 mm, of width no greater than 4.75 mm and of thickness no greater than the width, the ratio of the length to thickness being less than about 15, into two fractions a first of which contains particles of width and/or thickness less than about 1 mm and a second of which contains particles of width and/or thickness from about 1.0 mm to about 4.75 mm, slicing the particles in the second fraction to reduce the width and/or thickness thereof to from about 0.5 mm to about 2.375 mm with the length of each particle in the direction of its grain remaining substantially unchanged and with the ratio of particle length to thickness less than about 30, combining said first fraction and said sliced fraction, fractionating the combined fractions into at least two fractions one of which is relatively fine and the other relatively coarse, said relatively fine fraction containing particles from about 0.71 mm to less than about 1.4 mm width and/or thickness and said relatively coarse fraction containing particles from about 1.4 mm to about 2.375 mm width and/or thickness, treating the relatively fine and the relatively coarse fractions with a binding agent, and feeding the thus treated relatively fine and relatively coarse fractions to a forming device.

Advantageously, fractionation is accomplished with a sifter having a screen of predetermined mesh size and with wind sifter means. A plurality of wind sifter means in the form of cyclone separators may be employed. When, for example, two wind sifter means are used a third and even a fourth fraction may be separated from the relatively fine fraction, the third fraction being constituted of particles of width ranging from about 0.5 mm to less than about 0.71 mm and the fourth of particles of width less than about 0.25 mm. When thus separated, the third and fourth fractions are separately treated with a binding agent and then separately fed to the forming device.

Alternatively, instead of supplying the fourth fraction to the forming device it may be burned for heating gases used a drying medium in the process, as hereinafter described.

The invention also provides an apparatus for making chipboard from substantially 100% sawdust and comprises means for sifting and screening sawdust particles of varied width, length and thickness to form a first source of sawdust of at least 18 mesh size and a second sawdust source of between at least about 4 mesh to under about 18 mesh size, means for slicing the particles in the second source to from about 7 mesh to less than about 35 mesh size, bunker means for combining the first and second sources, fractionating means operatively connected with said bunker means for separating said combined sources into a relatively coarse and a relatively fine fraction, said fractionating means including cyclone separator means for dividing said relatively fine fraction into at least two further fractions having particles from about greater than 25 to about 60 and from about 14 to less than about 25 mesh size, respectively, second bunker means supplied with said relatively coarse fraction and with the coarser of the further fractions, first binder means for supplying a binder material to said sawdust particles from said second bunker means, second binder means for supplying a binder material to the finer of said further fractions, and wind layering means supplied with said binder applied particles for forming a chipboard.

A chipboard, substantially 100% sawdust, structure produced in accordance with the invention comprises a core portion and two opposed surface portions sandwiching the core portion, the core portion containing sawdust particles of from about 1.4 mm to about 2.4 mm width and each of the opposed surface portions containing particles under about 0.5 mm width, intervening portions between the core and surface portions containing particles from over about 0.5 mm to under about 1.4 mm width, all the particles in the chipboard having a length less than about 10 mm and a thickness no greater than the width, preferably less, with the ratio of length to thickness of each particle being less than about 30.

DESCRIPTION OF THE DRAWING

The attached drawings, provided for purpose of illustration and description, comprise three Figures of which:

FIG. 1 shows the superior bending strength of chipboard made in accordance with the invention as compared to the bending strength of chipboard produced by Liiri and Klauditz, especially in the range of lower volumetric weights between about 0.40 to 0.80 g/cm$^3$. As previously noted, sawdust boards made according to the invention have for all practical purposes the same advantageous properties of chipboard made with more expensive materials (other than sawdust).

The bending strength of chipboard is known to be inversely related to the transverse tensile strength of the board, that is, a board with especially high bending strength normally has a lower transverse tensile strength, and vice versa. It was therefore surprising to find that the higher bending strengths obtained with the sawdust chipboards of the invention did not result in an offsetting of the transverse tensile strength of the chipboard. FIG. 2 shows the superior tensile strength of chipboards made in accordance with the invention, as a function of volumetric weight, compared to the transverse tensile strength of chipboard produced by Liiri.

Without being bound to this explanation, it is believed that the relatively high bending and transverse tensile strength of sawdust boards of this invention is due to the manner in which the chips are processed.

Thus, the fine fractions normally discarded, are used in conjunction with coarser fractions which, contrary to the prior art, are transformed by slicing the sawdust particles in width and thickness, into finer fractions whereby to increase the supply of fine fraction particles.

Figure 3:
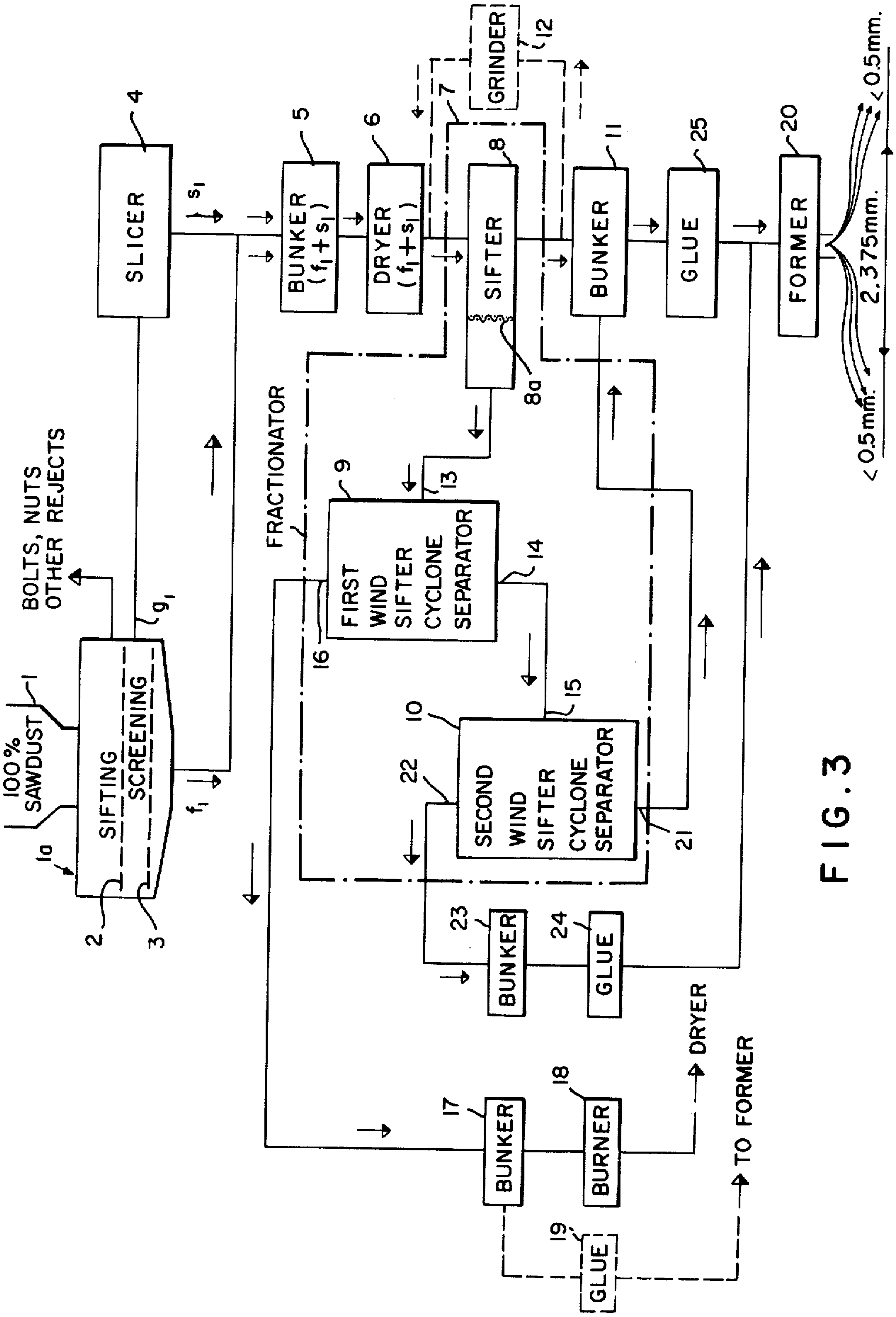
FIG. 3 is a block diagram of an installation for carrying out the method of the invention.

FIG. 3 is a block diagram of a system for carrying out the method. A hopper 1 contains substantially 100% sawdust fractions constituting the waste product from sawmill or planing mill operations, preferably with frame or circular saws, sawdust fractions from band saws and cross-cutting saws being equally useable. The mesh size and corresponding particle size of the width and/or thickness of the sawdust charge thus obtained and used for making chipboards are shown in Table 1 below which also shows the percentages by volume in which each fraction making up the sawdust charge is included.

TABLE 1

| MESH | SIZE(mm) | PERCENTAGE |
|---|---|---|
| 4 | 4.75 | 5.0 |
| 7 | 2.8 | 11.3 |
| 14 | 1.4 | 37.5 |
| 18 | 1.0 | 21.2 |
| 25 | 0.71 | 7.6 |
| 35 | 0.50 | 7.8 |
| 60 | 0.25 | 8.8 |
| 80 | 0.18 | 0.8 |

The sawdust fractions from hopper 1 are supplied to a sifting and screening device **1*a* provided with a vibratory screen 2 of at least 14 mesh size for passing therethrough sawdust no more than 4.75 mm width and/or thickness. Sawdust of larger size as well as foreign bodies, such as bolts, nuts and other rejects are removed as waste. If desired, the sawdust of larger size may be chopped into smaller acceptable size by wood choppers, not shown, and returned to the sifting and screening device. The latter includes a second screen 3** of at least 18 mesh size for passing therethrough a fine fraction of sawdust no more than 1.0 mm in width and/or thickness.

The sawdust fraction passing through screen 2 but not through screen 3 is fed as a coarse fraction $g_1$ to slicer 4. This coarse fraction contains sawdust particles of width and/or thickness ranging from above about 1.0 mm to about 4.75 mm. The slicer slices the wood particles along their length to reduce the width and/or thickness of the wood particles. Slicing occurs along the length of the wood particle because of reduced shear strength in that direction and may be accomplished, in known manner, by rotating knives, equipped on a knife ring, rotatable in a direction opposite to the direction of rotation of an impeller which revolves inside the knife ring. The slicer may advantageously comprise a Pallmann Flaker Mode PZ12, the knives of which are adjustable to permit passage therebetween, under suction produced by the rotating impeller (and auxiliary suction means if desired), of a particle of a predetermined width and/or thickness dictated by the spacing of the adjustable knives.

The sawdust fraction $f_1$ passing through screen 3 is fed to bunker 5 to which is also fed the sliced fraction $S_1$ from slicer 4. The fraction $S_1$ has particles of width and/or thickness ranging from above about 0.5 (35 mesh) to about 2.375 mm (about 7 mesh) so that when combined in bunker 5 with fine fraction $f_1$ (of particle width and/or thickness less than about 0.1 mm) the volume of the fine fraction is effectively increased.

From bunker 5, which may include a plurality of rotatable cylinders for flattening the upper strata of sawdust as it is moved by a conveyor belt toward discharge, the sawdust fractions $f_1$ and $S_1$ are fed to dryer 6 wherein these fractions are dried to an extent sufficient to remove during the transist of particles through the dryer, substantially all the moisture present in fractions $f_1$ and $S_1$. The dryer is a component manufactured and sold by Buttner Werke. Sawdust entering the dryer may be moved therethrough by a screw device or any other suitable means which will impart to the sawdust particles a helical path through the dryer in cooperation with jets of hot gases for removing moisture from the particles during their transist through the dryer which is assisted by suction means operative at the outlet end of the dryer to remove the particles therefrom. The specific construction of the dryer has not been shown since it is a commercially available component, that sold by Buttner Werke admirably serving the needs of this invention.

The dried sawdust fractions $f_1$ and S, are then supplied to a fractionating means 7 comprising a sifter 8, a first windsifter cyclone separator 9 and a second windsifter cyclone separator 10. The sifter 8 by means of a screen finer than 14 mesh **8*a* separates the combined fraction $f_1$ and $S_1$ into a relatively fine and a relatively coarse fraction. The relatively coarse fraction which is not passed by screen 8*a* comprises sawdust of width and/or thickness ranging between about 1.4 mm to about 2.375 mm and is supplied to bunker 11 or optionally to grinder 12** for increasing the fines by grinding the relatively coarse fraction to under 0.71 mm width and/or thickness 25 mesh.

Figure 1:
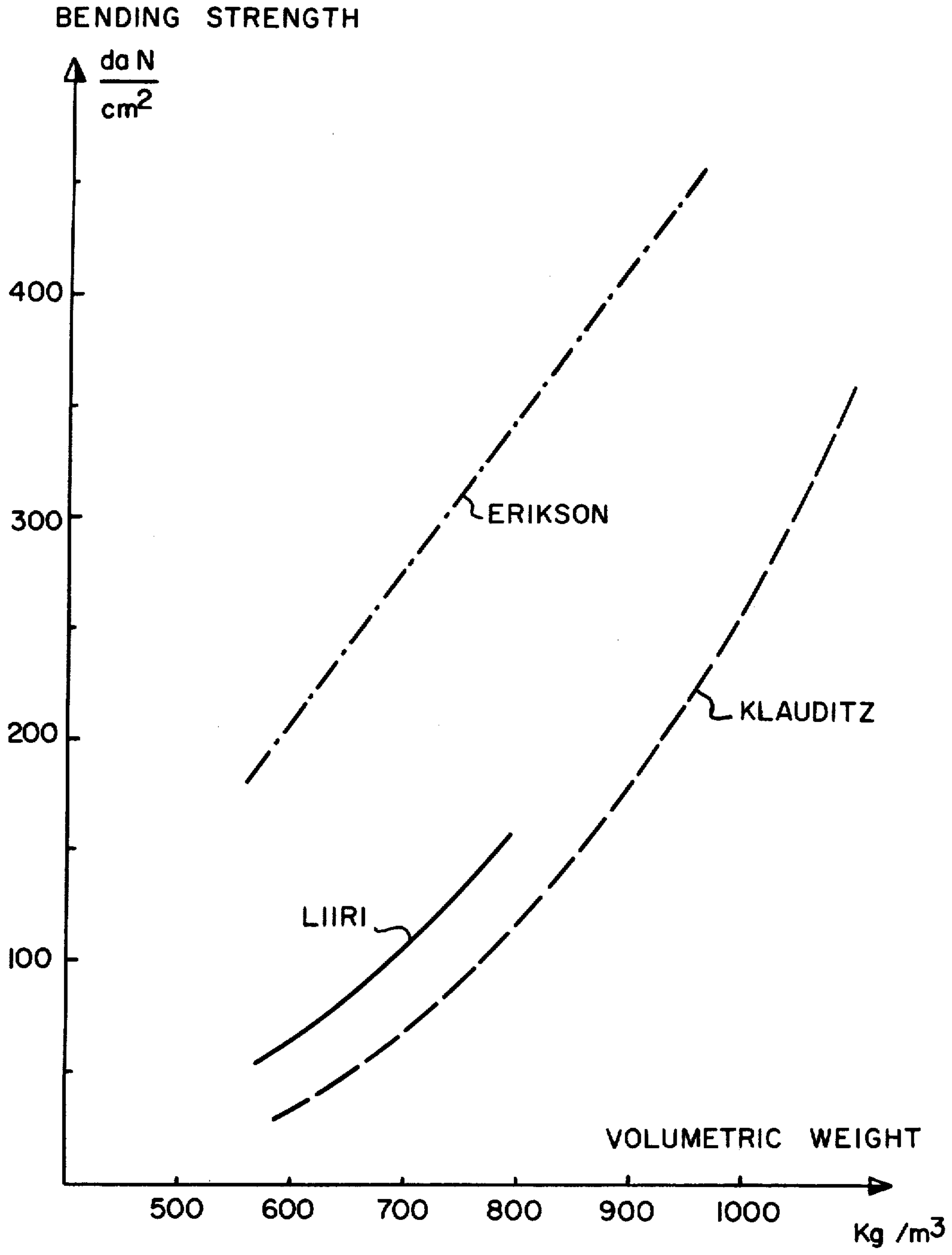
FIG. 1 is a plot of the bending strength of different sawdust boards as a function of volumetric weight.

The ground fine particle sawdust, as seen in FIG. 1, is returned from grinder 12 to sifter 8 for passage through screen **8*a*** along with the relatively fine fraction sawdust having a width and/or thickness ranging from less than about 0.5 mm to less than about 1.4 mm.

The relatively fine sawdust fraction (and also the ground fraction from grinder 12 when the latter is operative) passing through screen **8*a* is further fractionated by the first and second windsifter cyclone separators 9, 10**.

More specifically, the input 13 to the first windsifter cyclone separator 9 has supplied thereto particles ranging from about 0.5 mm to less than about 1.4 mm. The coarser components separated from the relative fine fraction are discharged from the bottom 14 of the separator and contain particles of width and/or thickness ranging from about 0.5 mm to about 1.4 mm which are supplied to the input 15 of the second windsifter cyclone separator 10. The finer components separated by windsifter 9 from the relatively fine fraction are discharged from the top 16 of the separator 9 and contain particles of width and/or thickness less than about 0.18 mm. These extremely fine particles are supplied to a bunker 17 similar to bunker 5 for either burning in a burner 18 for heating gases for use in the dryer or alternatively to a binder or gluing station 19 for feed of the glue applied particles to former 20.

The fraction supplied to input 15 of separator 10 is separated into two fractions, the first being discharged at the bottom 21 and containing particles of width and/or thickness ranging from between above about 0.71 (25 mesh) to less than 1.4 mm. The second fraction is discharged at the top 22 and contains particles of width and/or thickness ranging from between about 0.25 mm (60 mesh) to less than about 0.71 mm (25 mesh). The first fraction is supplied to bunker 11 along with the relatively coarse particles from sifter 8 while the second fraction is supplied to bunker 23.

The sawdust fractions in bunker 11 containing sawdust fractions from sifter 8 and from output 21 of wind-sifter cyclone separator 10 are supplied to a glue applying device 25 which may be similar to the device illustrated and described in U.S. Pat. No. 3,098,781 to Greten. The glue applied by device 25 to the sawdust particles from bunker 11 should be a low viscosity relatively faster drying glue than applied by gluing device 24 to the sawdust fractions from bunker 23. The glue may advantageously comprise a urea formaldehyde glue containing a minor amount of water and a glue wax emulsion. In any event, the sawdust with glue applied thereto at glue stations 24 and 25 (and 19 when the finest fractions are used instead of being burned) is supplied to the former 20 which may advantageously be a windlayering device of the kind described and illustrated in the aforementioned U.S. Pat. No. 3,098,781.

The process of the invention may be conducted continuously or in batch form. The bunkers, dryers and glue applying machines where a continuous operation is to be performed, may be adapted for continuously conveying sawdust particles for treatment thereof as previously described. These machines with conveyor belts or other forms of conveyances suited to the needs of the process are well known to the art so that a detailed description thereof is not deemed necessary for an understanding of this invention. Suffice it to say that a significant feature of the invention is making a sawdust chipboard from a raw sawdust material, waste product, of the type set forth in Table 1. Although, as will be seen from Table 1 the wood particles have a width and/or thickness of quite small dimensions by prior art standards, the particles having a width and/or thickness greater than 1 to 4.75 mm are nevertheless further sliced to provide an even larger percentage of fine particles with a width and thickness distinctly below about 0.1 mm. The improved results attained through such slicing is indeed surprising in light of the reported findings of Liiri, Klauditz, Ulbricht and Kratz to the contrary.

Many modifications of the invention may be made without departing from the spirit thereof. For example, instead of the fractions $f_1$ and $S_1$ being dried in the single dryer 6 each fraction could as well be dried separately in a separate dryer. Because of cost considerations it is preferred however to dry both fractions at the same time in a common dryer.

If separate dryers were used the sifter 8 could be eliminated in which case the fraction $f_1$ would directly be fed to the input 13 of separator 9 and the fraction $g_1$ would directly be fed to either grinder 12 or bunker 11. The output from grinder 12 in such case would also be fed to the input 13.

The components for carrying out the method of the invention may thus be modified and arranged as desired, it being only important that there be included a device such as the sifter and screening device, for separating unduly coarse constituents (rejects) if such should be present in the raw material. The slicing device also serves an important function in that it reduces the size of the coarse fraction in terms of thickness and/or width, without altering their length, to a size below 0.1 mm at least insofar as the coarse particles are concerned having an initial width and/or thickness between about 0.1 to 2.0 mm.

The forming device should be of such design that the coarsest particle size in the final chipboard is in its core portion and the finest particle size in the opposite surface portions, with the particle size increasing in the intervening portions of the chipboard from the surface portions to the midcore portion. The foregoing distribution of sawdust particles may be obtained by feeding the particles, after applying glue thereto, continuously and simultaneously to the forming device in the manner described in U.S. Pat. No. 3,098,781. A mat of particles is formed by the forming device on a conveyor in accordance with the weights of the individual particles as explained in U.S. Pat. No. 3,098,781. The mat after being subjected to a pressing operation is cut to the desired size.

The relative proportions in which the sawdust fractions are supplied to the forming device is readily determinable from the particle size distribution of the raw material source; see Table 1. For example, $f_1$ (particles no more than 1 mm) constitutes 46.2% by volume of the initial raw material charge and $g_1$ (particles from greater than 1 mm to 4.75 mm) constitutes the remainder i.e. 53.8%. After slicing the particles which are over 1 mm in width approximately 70% of the $g_1$ fraction (or 37.5% of the total) is reduced to a size below 1 mm width thereby increasing the percentage of the fines ($S_1$) to 83.7% leaving 16.3% of the $g_1$ fraction, i.e. particles over 1.0 mm width. The percentages of the sawdust fractions issuing from sifter 8 and separators 9 and 10 can similarly be determined as a function of the particle size distribution within each fraction.

The chipboards of the invention are characterized in that the core portion contains sawdust particles of from about 1.4 mm to about 2.4 mm widths, with each of the opposed surface portions containing particles under 0.5 mm width, intervening portions between said opposed surface portions and said core portions containing particles from over 0.5 mm to under 1.4 mm width, all the particles in the chipboard structure having a length less than about 10 mm and a thickness no greater than said width and a ratio of length to thickness less than 30.

A basic distinction between conventional chipboards and that produced by the invention is that in conventional chipboard the orientation of chips are parallel to the plane of the board mainly because the length of the chip ranges from 10 to 25 mm or more so that in forming the chipboard their largest dimension; i.e. their length will lie parallel to the plane of the board. In contradistinction, with sawdust boards according to the invention, the maximum length of the wood particles for the most part are distinctly below 10 mm. This ensures that the number of chips having their longitudinal axes transverse to the plane of the board will be considerable. Because of the small particle sizes used, there will also be a considerable number of particles or bunches of fibrous particles oriented with their grain direction at an angle to the plane of the board and will thus be located between paralleled and perpendicularly oriented particles, relative to the plane of the board. An advantage of this is that, during pressing after forming, the board is less compressible as a whole. This results in greater compression of the small particles in the surface layers than in conventional boards, so that the volumetric weight is greater close to the surface portion and smaller in the core fraction of the board. This, in turn, means that, for comparable volumetric weight the bending strength is greater in sawdust boards manufactured in accordance with the invention than in conventional chipboards.

In the light of the prior art referred to, the results attained are surprising since it had been thought that elongated flat chips yield a higher bending strength than short thin chips. The high bending strength together with high transverse tensile strength is obtained because the surface layer contains chips with high length to thickness ratio and of thickness and/or width below 0.5 mm whereby the surface layers may readily be compressed to a point yielding higher tensile and compressive strength than achieved with conventional chipboards (see FIG. 1).

Figure 2:
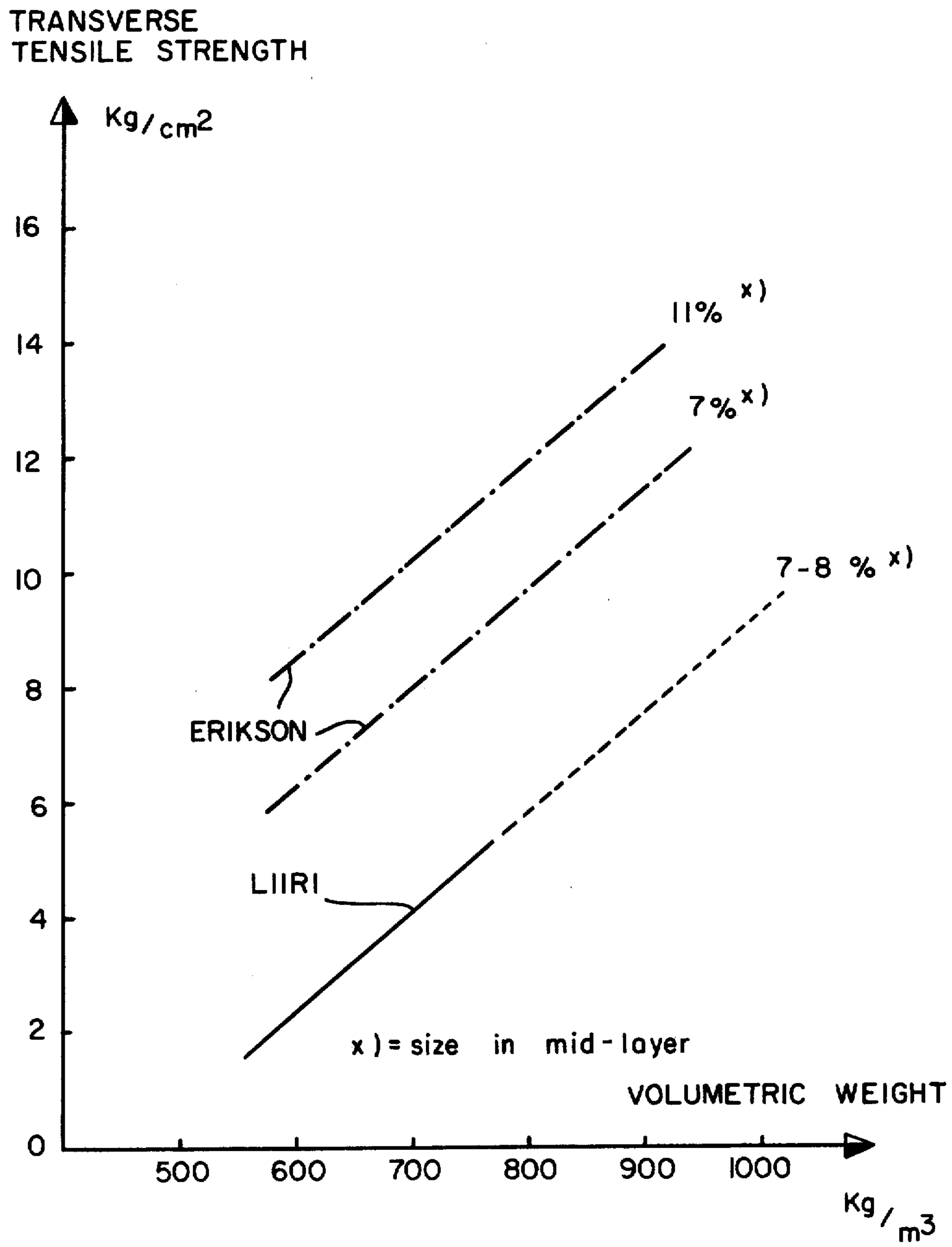
FIG. 2 is a plot of the transverse tensile strength of sawdust boards according to the invention and of conventional chipboards as a function of volumetric weight.

Because a considerable number of the fibers are oriented out of the plane of the board, a high transverse tensile strength is attained (up to twice that for conventional chipboards) with the same volumetric weight (see FIG. 2). Because of such orientation of the fibers the swelling of the board in thickness, in consequence of moisture absorption, is considerably less, since fibers do not swell in their longitudinal but rather in their transverse direction.

Whereas it was generally considered that pure sawdust, even with a relatively high content of binding agent, results in low strength chipboard, and whereas wood meal, dust and fine chips were considered unsatisfactory for use, the present invention enables use of pure sawdust, including such wood meal, dust and fine chips, with the same content of binding agent to attain higher strength values than hitherto possible in conventional chipboards (see FIGS. 1, 2).

It is also surprising that, through concentration of especially small particles at the surface, the chipboard of the invention attains improved strength values, in particular improved bending strength, all the more because specialists in the field, have proposed the use in the surface layer of conventional large size chips, i.e. chips of greater length and width dimension in the core portion and in the surface portion of the chipboard.

Obviously, such conventional chips may also be used in the surface layer of the chipboard of the invention but it is preferred not to do so because of cost considerations and the finding that the characteristics of the chipboard of the invention are as good as conventional chipboard made with conventional materials.

If for any reason it is desired to utilize the conventional materials in the surface portions of the chipboard of the invention the sifting and screening device can readily be adapted for discharging the conventional materials when admixed with the raw sawdust particles for separate treatment with glue before being conveyed to the forming device.

What is claimed is:

1. A method of making chipboard from substantially 100% sawdust, the method comprising separating particles of sawdust, of length less than about 10 mm, of width no greater than 4.75 mm and of thickness no greater than the width, the ratio of the length to thickness being less than about 15, into two fractions a first of which contains particles of width and/or thickness less than about 1 mm and a second of which contains particles of width and/or thickness from about 1.0 mm to about 4.75 mm, slicing the particles in the second fraction to reduce the width and/or thickness thereof to from 0.5 mm to about 2.375 mm with the length of each particle in the direction of its grain remaining substantially unchanged and with the ratio of particle length to thickness increased but less than about 30, combining said first fraction and said sliced fraction, fractionating the combined fractions into at least two fractions one of which is relatively fine and the other relatively coarse, said relatively fine fraction containing particles from about 0.71 mm to less than about 1.4 mm width and/or thickness and said relatively coarse fraction containing particles from about 1.4 mm to about 2.375 mm width and/or thickness, further fractionating said relatively fine fraction into two additional fractions, treating the sawdust fractions with a binding agent, and feeding the thus treated relatively fine and relatively coarse fractions to a forming device.

2. A process according to claim 1, wherein a third fraction is formed having particles from greater than about 0.25 mm to less than about 0.71 mm in width, said third fraction being separately treated with a binding agent before being fed to said forming device.

3. A process according to claim 2, wherein a fourth fraction is formed having particles of less than about 0.18 mm width, said fourth fraction being separately treated with a binding agent before being fed to said forming device.

4. A process according to claim 2, wherein a fourth fraction is formed having particles of less than about 0.18 mm width, said fourth fraction being burned to heat gases used for drying the combined first and second fractions before fractionating thereof.

5. A process according to claim 1 wherein said first fraction and said sliced fraction are fed to a common bunker from which they are continuously supplied to a common drying device for drying said particles.

6. A process according to claim 5, wherein the combined first and sliced second fractions, after drying thereof, are supplied to a sifter which separates the combined fractions into the relatively fine and the relatively coarse fractions, the relatively fine fraction being fed to first and second wind-sifter cyclone separators for deriving said third and fourth fractions.

7. A process according to claim 1, wherein said relatively coarse fraction after separation thereof from said relatively fine fraction by said sifter is ground to less than 25 mesh size.

8. A chipboard structure comprising substantially 100% sawdust and having a core portion and two opposed surface portions sandwiching said core portion, said core portion containing sawdust particles of from about 1.4 to about 2.4 mm width and each of said opposed surface portions containing particles under 0.5 mm width, intervening portions between said opposed surface portions and said core portions containing particles from over 0.5 mm to under 1.4 mm width, the particle size increasing from the surface portions toward said core portion, all the particles in the chipboard structure having a length less than about 10 mm and a thickness no greater than said width and a ratio of length to thickness less than 30.

9. A method of making chipboard from substantially 100% sawdust, the method comprising separating particles of sawdust, of length less than about 10 mm, of width no greater than 4.75 mm and of thickness no greater than the width, the ratio of the length being less than about 15, into two fractions a first of which contains particles of width less than about 1 mm and a second of which contains particles of width from about 1.0 mm to about 4.75 mm, slicing the particles in the second fraction to reduce the width and thickness thereof to from 0.5 mm to about 2.375 mm with the length of each particle in the direction of its grain remaining substantially unchanged and with the ratio of particle length to thickness less than about 30, separating said first and said sliced second fraction into a relatively coarse fraction containing particles from over about 1.4 mm to about 2.375 mm width and a relatively fine fraction containing particles from less than about 0.5 mm to less than about 1.4 mm, fractionating said relatively fine fraction into a fraction containing particles from over about 0.25 mm to less than about 0.71 mm width and a fraction containing particles from 0.71 to about 1.4 mm width, treating said relatively coarse and fractionated relatively fine fractions with a binding agent, and continuously feeding the thus treated fractions to a forming device.

10. A method according to claim 9, wherein said relatively coarse fraction and said fraction containing particles from approximately 0.71 to 1.4 mm are fed to a common gluing device for applying glue to said particles, said fraction containing particles from approximately 0.25 to 0.71 mm being fed to a separate gluing device, all of said fractions with glue applied thereto being simultaneously fed to said forming device.

* * * * *